United States Patent Office 3,784,469
Patented Jan. 8, 1974

3,784,469
PROCESS OF PREVENTING SCALE AND DEPOSIT FORMATION IN AQUEOUS SYSTEMS
Friedrich Krueger, Edingen, and Lieselotte Bauer, Bad Duerkheim, Germany, assignors to Joh. A. Benckiser GmbH, Chemische Fabrik, Ludwigshafen (Rhine), Germany
No Drawing. Filed June 16, 1972, Ser. No. 263,610
Claims priority, application Germany, July 1, 1971, P 21 32 802.9
Int. Cl. C02b 5/06
U.S. Cl. 210—58
15 Claims

ABSTRACT OF THE DISCLOSURE

Scale and deposit formation in aqueous systems is prevented or suppressed by the addition thereto of cyclohexane-1,2,3,4,5-pentacarboxylic acid preferably in substoichiometric amounts calculated for the scale and hardness causing compounds present in such aqueous systems. A synergistic effect is achieved by the admixture of substoichiometric amounts of amino alkylene phosphonic acids or alkane phosphonic acids.

BACKGROUND OF THE INVENTION (1) Field of the invention

The present invention relates to an improved process of preventing or suppressing scale and deposit formation in aqueous systems.

(2) Description of the prior art

Polyphosphates are used extensively in order to prevent or suppress scale and deposit formation in aqueous systems. The polyphosphates are used for this purpose mainly for the reason that they are effective in substoichiometric amounts, i.e. threshold quantities. In addition thereto they are relatively inexpensive. It is known, however, that, under certain conditions, the polyphosphates undergo hydrolysis in aqueous solution. As a result thereof relatively large amounts of said polyphosphates are required and, frequently, the scale and deposit formation preventing effect is unsatisfactory.

During the last few years phosphonic acids have become of ever increasing importance for use as complexing and sequestering agents because they are stable in aqueous solution for an almost unlimited period of time. The phosphonic acids are also capable of preventing scale and deposit formation even in substoichiometric amounts. On account of their resistance to hydrolysis they are used especially in aqueous systems. They thus can be added, for instance, to liquid cleaning and rinsing solutions. They are stable in such solutions for a prolonged period of time even under most varied conditions of use and storage. Phosphonic acids, however, have the disadvantage that they are considerably more expensive than polyphosphates. Their high price is due to the rather costly starting materials used in their manufacture.

It is also known to use polymeric compounds such as polyacrylic acids or dextrins for the same purpose of preventing scale and deposit formation in aqueous systems. However, to keep the hardness causing compounds in solution for a prolonged period of time, requires addition of such large amounts of the polymeric compounds that their use is highly uneconomical.

Cycloalkane polycarboxylic acids have been added alone or in mixture with phosphonic acids as so-called "builders" to detergents in aqueous solutions. Their use as builders for such synthetic detergents, i.e. as agents to improve detergency levels of the detergent compositions, however, requires at least stoichiometric amounts, i.e. amounts which are sufficient to cause complete complexing with the compounds causing the hardness of water. The preferred cycloalkane polycarboxylic acids used as builder additive are those with 3 or 4 carboxylic groups. The triethanolamine salt of cyclohexane-1,2,3,4,5,6-hexacarboxylic acid has also been suggested for this purpose.

It is also known that excellent complexing agents such as, for instance, ethylene diamine tetraacetic acid and nitrilo triacetic acid do not exhibit a threshold effect, i.e. they cannot be used in substoichiometric amounts to prevent or suppress scale and deposit formation in aqueous systems.

SUMMARY OF THE INVENTION

It is one object of the present invention to provide a highly effective process of preventing scale and deposit formation in aqueous systems which process is substantially free of the disadvantages of the known processes, i.e. whereby relatively inexpensive and stable scale and deposit formation preventing agents are used in substoichiometric, i.e. threshold amounts.

Other objects of the present invention and advantageous features thereof will become apparent as the description proceeds.

In principle the process according to the present invention consists in preventing scale and deposit formation in aqueous systems by adding thereto cyclohexane-1,2,3,4,5-pentacarboxylic acid in substoichiometric, i.e. threshold amounts, calculated for the hardness causing compounds present in said aqueous system. The cyclohexane - 1,2,3,4,5-pentacarboxylic acid is added to said systems either alone or in mixture with phosphonic acids.

The excellent seeding, i.e. threshold effect of cyclohexane-1,2,3,4,5-pentacarboxylic acid is quite surprising because, heretofore, phosphonic acids and polymers such as polyacrylic acid or polysaccharides, for instance, dextrins were the only organic seeding agents known heretofore. A hardness stabilizing effect of monomeric compounds which are free of nitrogen and phosphorus has not been described before and is completely unexpected.

It is known that highly effective complexing agents such as ethylene diamino tetraacetic acid or nitrilo triacetic acid do not exhibit any threshold activity. Thus it is quite surprising that addition of substoichiometric amounts (threshold amounts) of cyclohexane - 1,2,3,4,5-pentacarboxylic acid either alone or in mixture with phosphonic acids to aqueous systems prevents scale formation and deposition in aqueous systems.

The amounts of cyclohexane-1,2,3,4,5-pentacarboxylic acid added to the aqueous system may be as high as 500 mg./l. of water and is preferably between about 5 mg./l. and 30 mg./l. of water.

Compared with the known polymeric compounds which have a scale and deposit preventing effect in substoichiometric amounts such as polyacrylic acid or dextrins the cyclohexane-1,2,3,4,5-pentacarboxylic acid has a surprisingly superior effect. Its threshold value is as high as that of a number of phosphonic acids and is in general between that of the phosphonic acids and the polymeric compounds.

According to a preferred embodiment of the present invention the hardness stabilizing effect of the cyclohexane-1,2,3,4,5-pentacarboxylic acid is considerably enhanced by using a mixture of said acid with a phosphonic acid. The proportion by weight of the pentacarboxylic acid to phosphonic acid is between about 1:1 and about 50:1 and preferably between about 2:1 and 10:1. In general amounts up to 500 mg. of said mixture are added to each liter of water. Such mixtures produce a synergistic effect which far surpasses the effect of each compound added alone to water.

Suitable amino alkylene phosphonic acids are those which are obtained by reacting ammonia, monoamines, or polyamines with formaldehyde and phosphorous acid or phosphorus trichloride. Such acids are, for instance, amino tris-(methylene phosphonic acid);
1,2- and 1,3 - propylene diamino tetra-(methylene phosphonic acid);
ethylene diamino tetra-(methylene phosphonic acid);
dipropylene triamino penta-(methylene phosphonic acid);
and the like amino alkylene phosphonic acids.

Useful alkane phosphonic acids are, for instance, 1-hydroxy ethane-1,1-diphosphonic acid;
1-amino ethane-1,1-diaminophosphonic acid;
methylene diphosphonic acid;

and the like alkane phosphonic acids.

As stated above, the cyclohexane - 1,2,3,4,5-pentacarboxylic acid alone or in mixture with phosphonic acids according to the present invention are added to cleaning compositions as they are known to the art and especially to acid or alkaline cleaning and rinsing fluids. Of particular advantage is the addition of such compositions to cleaning and rinsing fluids used in automatically operating bottle cleaning and rinsing machines or in cleaning tanks and other types of containers. In such cleaning operations scale and deposit formation takes place especially at the stage when the bottles, tanks, or containers are rinsed with fresh water, i.e. at that stage of the cleaning and rinsing process when only traces of the cleaning agent diluted with large amounts of rinsing water are present and are removed by rinsing. Such scale formation is prevented by the presence of small (seeding or threshold) amounts of the hardness stabilizing cyclohexane - 1,2,3,4,5 - pentacarboxylic acid alone or in mixture with a phosphonic acid according to the present invention in the strongly diluted rinsing water. If necessary, small amounts of the agent or agents according to the present invention may be added to the rinsing fluids for application to those zones of the aqueous system which are especially exposed to scale and deposit formation.

The process according to the present invention can be carried out with great advantage in all those instances, in which it is desired for several reasons to reduce the amounts of phosphorus and/or nitrogen, or to completely eliminate the same in industrial and domestic waste water and sewage. This is of particular importance for ecological reasons.

The effective hardness stabilizing cyclohexane-1,2,3,4,5-pentacarboxylic acid is produced, for instance, according to French Pat. No. 2.011,655 by oxidizing bicyclo-(2,2,2)-octane-(7)-2,3,5-tricarboxylic acid-2,3-mono-anhydride by means of nitric acid.

DESCRIPTION OF THE PREFERRED EMBODIMENTS

The attached tables show the surprisingly high scale and deposit formation preventing or suppressing effect of cyclohexane-1,2,3,4,5-pentacarboxylic acid or its mixtures with phosphonic acids in aqueous systems in comparison with the known scale and deposit formation preventing polymeric agents such as dextrin or polyacrylic acid or polyphosphates, or the phosphonic acids alone.

Table I shows the threshold values of such agents at room temperature. Thereby, the threshold value was determined by adding to and dissolving in one liter of water of about 17° German hardness placed in a glass beaker, a predetermined amount, in mg., of the compound to be tested. 12 g. of sodium hydroxide are added thereto. The beaker was covered with a watch glass and was allowed to stand at room temperature. It was then observed and noted after how many days a glass rod placed into the beaker and/or the walls of the beaker showed formation and deposition of crystals thereon.

0 in the following tables indicates that no crystals, i.e. incrustations are deposited on the glass rod and/or the wall of the beaker while — indicates deposit formation.

Table II shows that the seeding effect, i.e. the scale and deposit formation preventing effect on addition of substoichiometric amounts, is preserved even at a higher temperature, namely at a temperature of 55° C. The tests were carried out by adding to 490 ml. of distilled water 3 ml. of molar sodium carbonate solution and 5 mg. of the compound to be tested and then admixing thereto 15 ml. of a 0.1 molar calcium chloride solution corresponding to 60.1 mg. of calcium while stirring. The solution is allowed to stand at 55° C. for 24 hours. Thereafter, the precipitated calcium carbonate is filtered off and the calcium remaining dissolved in the filtrate is titrated with a 0.1 molar "Titriplex" solution.

Table III shows the synergistic effect of mixtures of cyclohexane - 1,2,3,4,5 - pentacarboxylic acid and phosphonic acids whereby the tests are evaluated as described hereinabove with respect to Table I.

The attached Table IV gives the abbreviations used in Tables I, II, and III to designate the tested compounds.

Of course, cyclohexane-1,2,3,4,5-pentacarboxylic acid and its combinations with phosphonic acids exhibit a satisfactory hardness stabilizing effect also in water at its proper pH-value. The tests described in Tables I, II, and III, however, were carried out in the alkaline pH-range in order to illustrate the advantageous hardness stabilizing effect of cyclohexane-1,2,3,4,5-pentacarboxylic acid and its combinations with phosphonic acids in such media as they are prevalent in many cleaning and rinsing operations.

The cyclohexane-1,2,3,4,5-pentacarboxylic acid and its combinations with phosphonic acids according to the present invention are added to conventional cleaning compositions and especially to acid or alkaline cleaning and rinsing fluids. Improved cleaning and rinsing fluids according to the present invention are, for instance, of the following composition without, however, being limited thereto.

EXAMPLE 1

Composition: Percent
Mixture of phosphoric acid mono- and dimethyl esters (Knapsack A.G.) _____ 40
Cyclohexane-1,2,3,4,5-pentacarboxylic acid ____ 20
Antifoaming agent, i.e. a bulk polymer of ethylene oxide with polypropylene glycol sold under the trademark Pluronic L 61 (Wyandotte) __ 10
Water _____ 30

0.2% of said composition are dissolved in a cleaning fluid consisting of aqueous 1% sodium hydroxide solution. The resulting cleaning fluid has proved to be highly effective in the cleaning and rinsing of glass bottles.

EXAMPLE 2

Composition: Percent
Sodium silicate _____ 35
Mixture of 4 parts of cyclohexane-1,2,3,4,5-pentacarboxylic acid and 1 part of nitrilo tri-(methylene phosphonic acid) _____ 3
Sodium carbonate _____ 20
Sodium hydroxide _____ 17
Wetting agent, i.e. the nonyl phenol polyglycol ether with 6 moles of ethylene oxide per mole of nonyl phenol sold under the trademark Arkopal N/O 60 (Hoechst) _____ 5
Sodium sulfate _____ 10
Trisodium orthophosphate_____ 10

1% aqueous solutions of said mixture are advantageously used for cleaning and rinsing milk cans.

EXAMPLE 3

The composition is the same as given hereinabove in Example 1, whereby, however, the mixture of cyclohexane-1,2,3,4,5-pentacarboxylic acid and nitrilo tri-(methylene phosphonic acid) is replaced by a mixture of 5 parts of cyclohexane - 1,2,3,4,5-pentacarboxylic acid and 2.5 parts of ethylene diamino tetra-(methylene phosphonic acid).

0.2% of the resulting composition are dissolved in aqueous 1% sodium hydroxide solution to yield a highly advantageous bottle rinsing solution.

EXAMPLE 4

The composition is the same as given hereinabove in Example 1, whereby, however, the mixture of cyclohexane-1,2,3,4,5-pentacarboxylic acid and nitrilo tri-(methylene phosphonic acid) is replaced by a mixture of 5 parts of cyclohexane-1,2,3,4,5-pentacarboxylic acid and 5 parts of diethylene triamino penta(methylene phosphonic acid).

1% aqueous solutions of said mixture have proved to be effective cleaning fluids for milk cans.

EXAMPLE 5

Composition: Percent
Tripolyphosphate _____ 40
Cyclohexane-1,2,3,4,5-pentacarboxylic acid ____ 10
Antifoaming agent Pluronic L 61 (Wyandotte) __ 5
Trisodium orthophosphate _____ 10
Sodium gluconate _____ 35

0.2% of said mixture are dissolved in aqueous 1.5% sodium hydroxide solution. The resulting solution is a highly effective solution for cleaning bottles and especially bottles with aluminum accessories such as aluminum labels and/or caps.

EXAMPLE 6

Composition: Percent
Mixture of phosphoric acid mono methyl ester and of phosphoric acid isopropyl ester (Knapsack A.G.) _____ 40
Cyclohexane-1,2,3,4,5-pentacarboxylic acid ____ 20
Water _____ 40

0.2% of said mixture are dissolved in aqueous 1% sodium hydroxide solution. The resulting cleaning solution has proved to be a highly effective bottle rinsing fluid.

EXAMPLE 7

Composition: Percent
Aqueous 67% gluconic acid solution _____ 70
Cyclohexane-1,2,3,4,5-pentacarboxylic acid ____ 20
Water _____ 10

0.2% of said mixture are dissolved in aqueous 1% sodium hydroxide solution. The resulting cleaning solution has proved to be a highly effective bottle rinsing fluid.

EXAMPLE 8

Composition: Percent
Sodium silicate _____ 35
Cyclohexane-1,2,3,4,5-pentacarboxylic acid ____ 3
Sodium carbonate _____ 20
Sodium hydroxide _____ 17
Wetting agent, i.e. the nonyl phenol polyglycol ether with 6 moles of ethylene oxide per mole of nonyl phenol sold under the trademark Arkopal N/O 60 (Hoechst) _____ 5
Sodium sulfate _____ 10
Trisodium orthophosphate _____ 10

1% aqueous solutions of said mixture are advantageously used for cleaning and rinsing milk cans.

As stated hereinabove, the hardness stabilizing effect of the cyclohexane-1,2,3,4,5-pentacarboxylic acid is considerably enhanced by using said acid in combination with a phosphonic acid. In principle amino alkylene phosphonic acids of the following Formula I have proved to have an unexpected synergistic effect on the cyclohexane-1,2,3,4,5-pentacarboxylic acid:

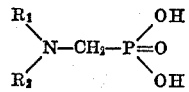
(I)

In said formula
$R_1$ represents the group of the formula

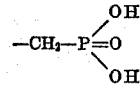

and
$R_2$ represents either
(a) the group of the formula

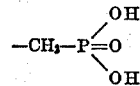

or
(b) the group of the formula

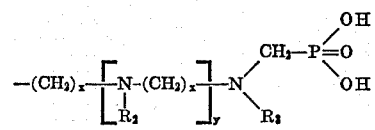

wherein
$R_3$ and $R_4$
(1) both represent the group of the formula

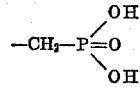

or
(2) one of $R_3$ and $R_4$ is hydrogen and the other one is the group of the formula

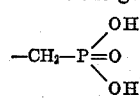

or
(3) both are hydrogen; while
$x$ is one of the numerals 2 and 3; and
$y$ is one of the numerals from 0 to 4; or
(c) the group of the formula

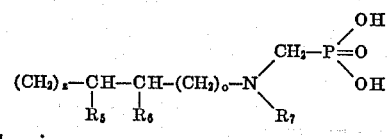

wherein
$R_5$ is hydrogen or hydroxyl; and
$R_6$ is hydrogen or alkyl, preferably lower alkyl, such as methyl, and $R_5$ and $R_6$ together with the two carbon atoms to which they are attached, form a cycloalkyl ring, preferably with four, five, or six carbon atoms, such as cyclobutyl, cyclopentyl, or cyclohexyl; while
$o$ and $z$ are one of the numerals 0 and 1; and
$R_7$ is hydrogen or the group of the formula

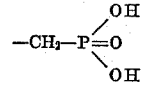

or
(d) the group of the formula

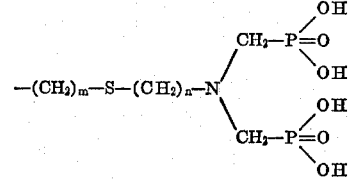

wherein
$m$ and $n$ are the numerals 1 to 3.

Thus in addition to the phosphonic acids listed hereinabove and added in Examples 2 to 4, there can also be employed the following phosphonic acids:

1,3-diamino-2-propanol tetra-(methylene phosphonic acid);

carboxylic acid, cyclohexane tetracarboxylic acid, and cyclohexane hexacarboxylic acid in comparison with cyclohexane-1,2,3,4,5-pentacarboxylic acid. The tests were carried out in the same manner as described hereinabove for the tests illustrated in Table I.

TABLE I

Threshold seeding effect of cyclohexane-1,2,3,4,5-pentacarboxylic acid compared with that of known agents at room temperature

| Test number | Compound | Amount added in mg. | Calcite crystals deposited after— | | | | | | | |
|---|---|---|---|---|---|---|---|---|---|---|
| | | | 1 day | 2 days | 3 days | 4 days | 5 days | 6 days | 7 days | 8 days |
| 1 | CPC | 5 | 0 | 0 | | | | | | |
| 2 | CPC | 7.5 | 0 | 0 | 0 | 0 | 0 | | | |
| 3 | CPC | 10 | 0 | 0 | 0 | 0 | 0 | 0 | 0 | |
| 4 | Dextrin yellow | 10 | | | | | | | | |
| 5 | Dextrine white | 10 | 0 | | | | | | | |
| 6 | Polacrylic acid | 10 | | | | | | | | |
| 7 | NTMP | 2.5 | 0 | | | | | | | |
| 8 | NTMP | 5 | 0 | 0 | 0 | 0 | 0 | 0 | | |
| 9 | EDTMP | 2.5 | 0 | 0 | 0 | | | | | |
| 10 | EDTMP | 5 | 0 | 0 | 0 | 0 | 0 | 0 | 0 | |
| 11 | DETPMP | 2.5 | 0 | | | | | | | |
| 12 | DETPMP | 5 | 0 | 0 | 0 | 0 | 0 | | | |
| 13 | HEDP | 5 | 0 | | | | | | | |
| 14 | HEDP | 10 | 0 | 0 | 0 | | | | | |
| 15 | EDTA | 30 | | | | | | | | |
| 16 | EDTA | 50 | | | | | | | | |
| 17 | NTA | 30 | | | | | | | | |
| 18 | NTA | 50 | | | | | | | | |

See Table IV for explanation of abbreviations.

1,2-bis-(amino methyl) cyclobutane tetra-(methylene phosphonic acid);
1,2-cyclohexane diamino tetra-(methylene phosphonic acid);
1-aminomethyl cyclopentyl amino-(2)-tetra-(methylene phosphonic acid);

and others.

The "Titriplex" solution mentioned hereinabove is an ethylene diamino tetraacetic acid solution.

TABLE II

Threshold seeding effect of cyclohexane-1,2,3,4,5-pentacarboxylic acid compared with that of known agents at 55° C.

| Compound | Amount added in mg. | Calcium dissolved in percent |
|---|---|---|
| Test number: | | |
| 19 Control | | 0.5 |
| 20 CPC | 5 | 26.6 |
| 21 NTMP | 5 | 31.6 |
| 22 DETPMP | 5 | 30.6 |
| 23 HEDP | 5 | 31.6 |
| 24 Dextrin white | 5 | 1.0 |
| 25 Polyacrylic acid | 5 | 4.3 |
| 26 Graham salt | 5 | 24.6 |

See Table IV for explanation of abbreviations.

TABLE III

Threshold seeding effect of mixtures of cyclohexane-1,2,3,4,5-pentacarboxylic acid and phosphonic acids

| Compounds | Amounts added in mg. | Calcite crystals deposited after— | | | | | | | | |
|---|---|---|---|---|---|---|---|---|---|---|
| | | 2 days | 4 days | 6 days | 8 days | 10 days | 12 days | 14 days | 16 days | 18 days | 20 days |
| Test number: | | | | | | | | | | |
| 27 Mixture of CPC and NTMP | 5 / 2.5 | 0 | 0 | 0 | 0 | 0 | | | | |
| 28 do | 8 / 2 | 0 | 0 | 0 | 0 | 0 | 0 | 0 | | |
| 29 Mixture of CPC and EDTMP | 5 / 2.5 | 0 | 0 | 0 | 0 | 0 | 0 | 0 | | |
| 30 do | 8 / 2 | 0 | 0 | 0 | 0 | 0 | 0 | 0 | | |
| 31 Mixture of CPC and DETPMP | 5 / 5 | 0 | 0 | 0 | 0 | 0 | 0 | 0 | 0 | 0 |
| 32 do | 8 / 2 | 0 | 0 | 0 | 0 | 0 | 0 | 0 | | |

See Table IV for explanation of abbreviations.

It is highly surprising that the cyclohexane-1,2,3,4,5-pentacarboxylic acid has the high scale and deposit formation suppressing or preventing effect and can be used in substoichiometric amounts for this purpose in view of the fact that other cycloalkane polycarboxylic acids which are used as builders for synthetic detergents in aqueous solutions are entirely ineffective. The attached Table V illustrates the test results obtained with cyclopentane tetra-

TABLE IV

Abbreviations used to designate the compounds tested according to Tables I to III

| Abbreviation: | Indicates the following compound— |
|---|---|
| CPC | Cyclohexane-1,2,3,4,5-pentacarboxylic acid. |
| NTMP | Nitrilo tris-(methylene phosphonic acid). |
| EDTMP | Ethylene diamino tetra-(methylene phosphonic acid.) |
| DETPMP | Diethylene triamino penta-(methylene phosphonic acid). |
| HEDP | 1-hydroxy ethane-1,1-diphosphonic acid. |
| EDTA | Ethylene diamino tetraacetic acid. |
| NTA | Nitrilo triacetic acid. |

TABLE V

Threshold seeding effect of cycloalkane polycarboxylic acid at room temperature

| Text number | Compound tested | Amount added in mg. | Calcite crystals deposited after— | | | | | | | | | |
|---|---|---|---|---|---|---|---|---|---|---|---|---|
| | | | 1 day | 2 days | 3 days | 4 days | 5 days | 6 days | 7 days | 8 days | 9 days | 10 days |
| 33 | Cyclopentane tetracarboxylic acid | 10 | | | | | | | | | | |
| | | 30 | | | | | | | | | | |
| 34 | Cyclohexane tetracarboxylic acid | 10 | | | | | | | | | | |
| | | 30 | | | | | | | | | | |
| 35 | Cyclohexane hexacarboxylic acid | 10 | | | | | | | | | | |
| | | 30 | | | | | | | | | | |
| 36 | Cyclohexane-1,2,3,4,5-pentacarboxylic acid | 10 | 0 | 0 | 0 | 0 | 0 | 0 | 0 | 0 | 0 | |
| | | 30 | 0 | 0 | 0 | 0 | 0 | 0 | 0 | 0 | | 0 |

We claim:

1. In a process of preventing scale and deposit formation in aqueous systems, the step which comprises adding to the aqueous system, as scale and deposit formation suppressing agent, cyclohexane-1,2,3,4,5-pentacarboxylic acid in substoichiometric amounts calculated for the amount of hardness causing compounds present in the aqueous system.

2. The process of claim 1, in which cyclohexane-1,2,3,4,5-pentacarboxylic acid is present in the aqueous system in an amount between about 5 mg./liter and about 500 mg./liter of water.

3. The process of claim 1, in which cyclohexane-1,2,3,4,5-pentacarboxylic acid is present in the aqueous system in an amount between about 5 mg./liter and about 30 mg./liter of water.

4. The process of claim 1, in which a mixture of cyclohexane-1,2,3,4,5-pentacarboxylic acid and a scale and deposit formation suppressing phosphonic acid is added to the aqueous system in substoichiometric amounts calculated for the amount of hardness causing compounds present in said aqueous system.

5. The process of claim 4, in which the proportion of cyclohexane-1,2,3,4,5-pentacarboxylic acid to phosphonic acid is between about 1:1 and about 50:1.

6. The process of claim 4, in which the proportion of cyclohexane-1,2,3,4,5-pentacarboxylic acid to phosphonic acid is between about 2:1 and about 10:1.

7. The process of claim 4, in which the phosphonic acid is an amino methylene phosphonic acid.

8. The process of claim 4, in which the phosphonic acid is an alkane phosphonic acid.

9. The process of claim 4, in which the phosphonic acid is nitrilo tris-(methylene phosphonic acid).

10. The process of claim 4, in which the phosphonic acid is ethylene diamino tetra-(methylene phosphonic acid).

11. The process of claim 4, in which the phosphonic acid is diethylene triamino penta-(methylene phosphonic acid).

12. The process of claim 4, in which the phosphonic acid is 1,3-propylene diamino tetra-(methylene phosphonic acid).

13. The process of claim 4, in which the phosphonic acid is 1-hydroxy ethane-1,1-diphosphonic acid.

14. The process of claim 4, in which the phosphonic acid is 1-amino ethane-1,1-diphosphonic acid.

15. The process of claim 4, in which the phosphonic acid is methylene diphosphonic acid.

References Cited

UNITED STATES PATENTS

| | | | |
|---|---|---|---|
| 3,639,645 | 2/1972 | Miller et al. | 252—180 |
| 3,629,291 | 12/1971 | Nohe | 260—514 K |
| 3,733,270 | 5/1973 | Kerst | 210—58 |
| 3,451,939 | 6/1969 | Ralston | 210—58 |

FRANK A. SPEAR, JR., Primary Examiner

B. CASTEL, Assistant Examiner

U.S. Cl. X.R.

252—180

UNITED STATES PATENT OFFICE
CERTIFICATE OF CORRECTION

Patent No. 3,784,469          Dated January 8, 1974

Inventor(s) FRIEDRICH KRUEGER and LIESELOTTE BAUER

It is certified that error appears in the above-identified patent and that said Letters Patent are hereby corrected as shown below:

Column 6, line 20: The formula should read as follows:

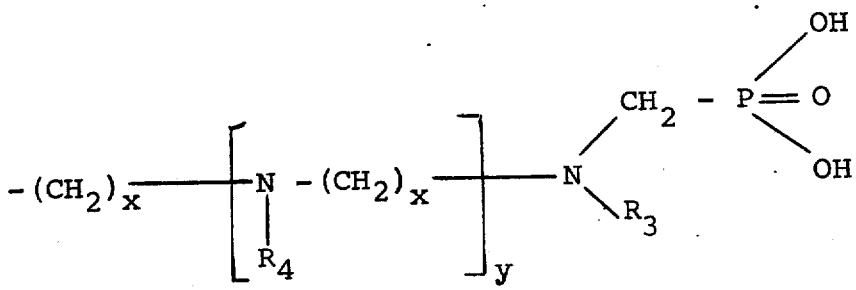

Signed and sealed this 21st day of May 1974.

(SEAL)
Attest:

EDWARD M. FLETCHER, JR.
Attesting Officer

C. MARSHALL DANN
Commissioner of Patents